United States Patent Office 3,207,492
Patented Sept. 21, 1965

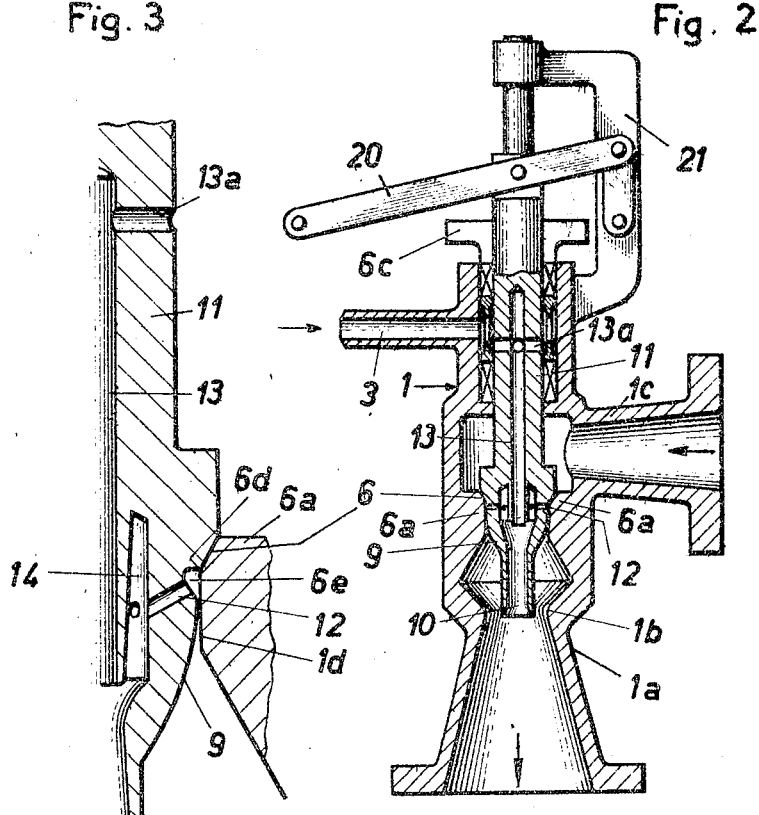

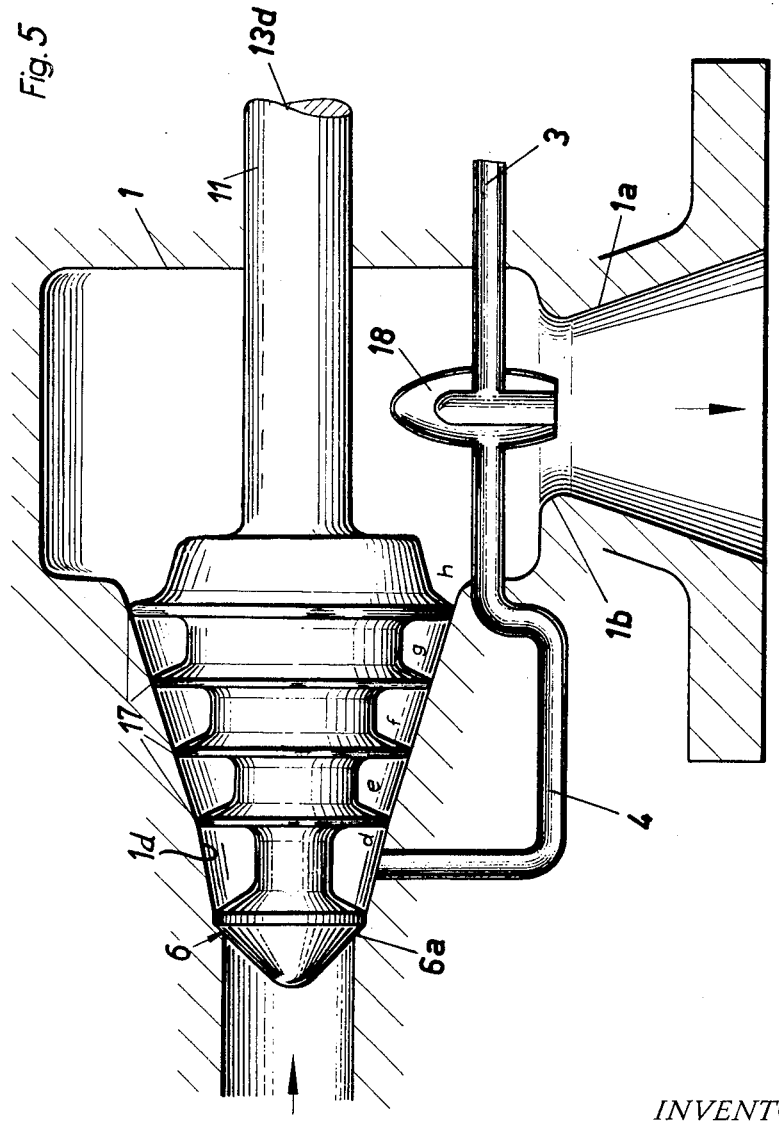

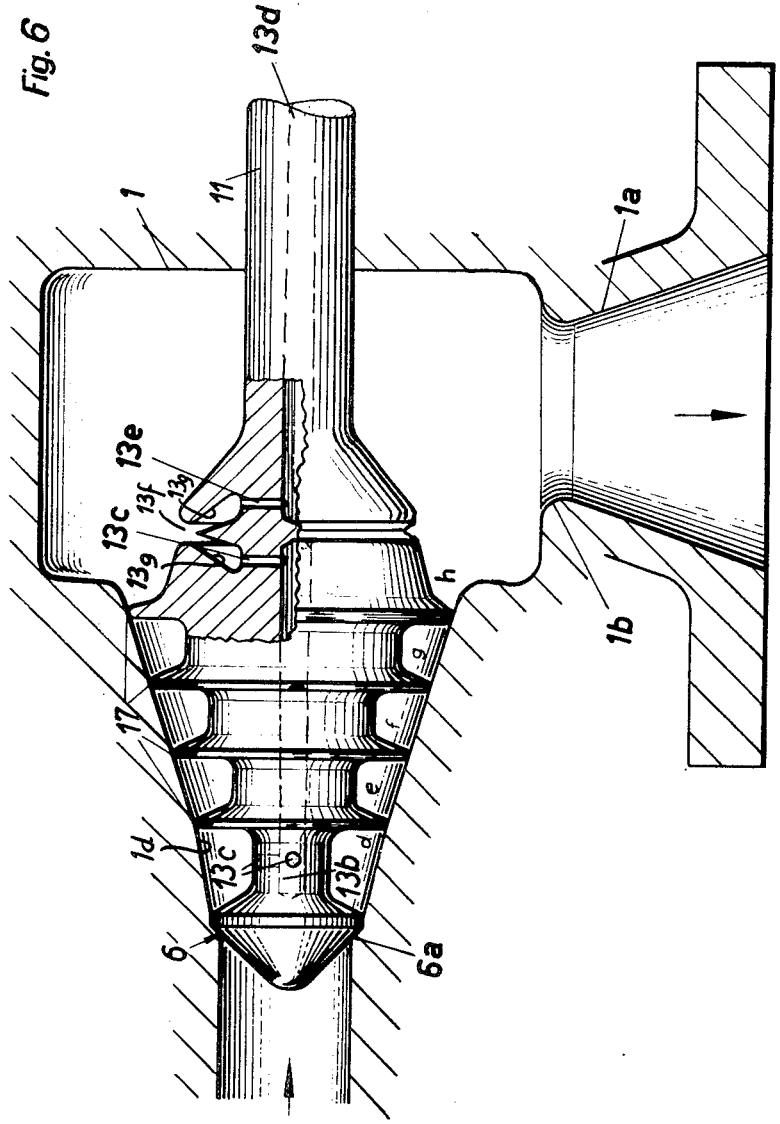

3,207,492
APPARATUS FOR CONTROLLING THE PRESSURE AND TEMPERATURE OF GAS BY SPRAYING IT WITH WATER
Carl Herbert Zikesch, Dusseldorf-Kaiserswerth, Germany, assignor to Bendek, Firma Oscar Kohler, Zurich, Switzerland
Filed July 3, 1961, Ser. No. 121,680
Claims priority, application Germany, July 5, 1960, Z 8,119, Z 6,679; July 9, 1960, Z 8,129
17 Claims. (Cl. 261—46)

The present invention relates to a novelly constructed apparatus for controlling the pressure and temperature of a gaseous or vaporific working medium by supplying water or another suitable cooling medium to a reduction station, for example, a pressure reduction station.

Heretofore known prior art constructions provide for an arrangement wherein the point of injection of the water or the cooling medium is located in the seat of the valve or in close proximity thereto, and where throttling of the working medium occurs. Vapor condensators are also known to the art which employ a Venturi nozzle and conduct into the vapor stream, at the point of narrowest nozzle cross-section, a supply of water which is initially fed from outside of the nozzle. To this end, the throat portion of the Venturi tube is surrounded by a ring-shaped channel registering with the inner nozzle portion of the Venturi tube by means of apertures or slots. The cooling medium or water is fed by means of this ring-shaped channel into the Venturi tube and is then commingled with the vapor stream.

It has been noted, however, that all of the prior art devices known to the art are not sufficient to guarantee an intensive atomization or spraying of the water under different load conditions. It has also been proposed, not to permit entry of the water directly into the gas stream, but rather, to previously atomize the water by means of a branch stream of vapor, and then to admit this mixture into contact with the main vapor stream. However, such an arrangement requires that a second closing means be provided for the branched-off vapor mass employed for atomization.

The present invention employs the known principle of actuating the atomizing apparatus by means of a branch stream of the working medium, and also employs the combination of such an atomizer arrangement in cooperable working relation with a Venturi tube. The salient feature of the present invention is particularly noteworthy, in that, a combination of throttle valve, branching-off of the main stream to form a branch vapor stream for atomizing the water, and the intimate mixing and commingling thereof in a Venturi tube may be achieved in a single assembly. Such may effectively be obtained by utilizing the pressure drop occurring in the throttling apparatus and by providing connecting or by-pass channel means forward of the throttling member or between the regulating valve and the atomizer unit in such a manner, that, the main vapor stream and the branch stream necessary for atomizing the water are collectively or simultaneously shut-off by means of the closing seat portion of the regulating valve, which seat portion is pre-positioned with respect to the throttle member of a throttle valve.

Accordingly, it is an important object of the present invention to provide a novelly constructed apparatus for controlling the pressure and temperature of a gaseous or vaporific working medium, and which overcomes the disadvantages present in heretofore known devices.

Another important object of the present invention is to provide a cooling apparatus for a working medium wherein the flow of the working medium and a branch stream thereof for atomizing a cooling medium is controlled by a common valve member.

Still another important object of the present invention is to provide a pressure reducing and cooling installation for regulating the pressure and temperature of a gas or vaporific medium which is relatively simple and compact in structure, easy to install and service, comparatively economical to manufacture, yet highly reliable and efficient in carrying out its required function.

Yet a further important object of the present invention is to provide means for effectively regulating the supply of a main vapor stream and branch stream for atomizing a cooling medium.

Still another object of the present invention is to combine in a simplified and compact structure an apparatus of the type described in conjunction with a Venturi tube arrangement for controlling the temperature and pressure of a gaseous medium.

These and still further objects, features and advantages, and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 2 is a longitudinal, cross-sectional view of another construction embodying the teachings of the present invention;

FIGURE 3 is a fragmentary and enlarged cross-sectional view illustrating details of the atomizer and valve arrangement employed in the construction depicted in FIGURE 2;

FIGURE 4 is a fragmentary, cross-sectional view illustrating a further possible construction of the control apparatus of the present invention;

Figure 1:
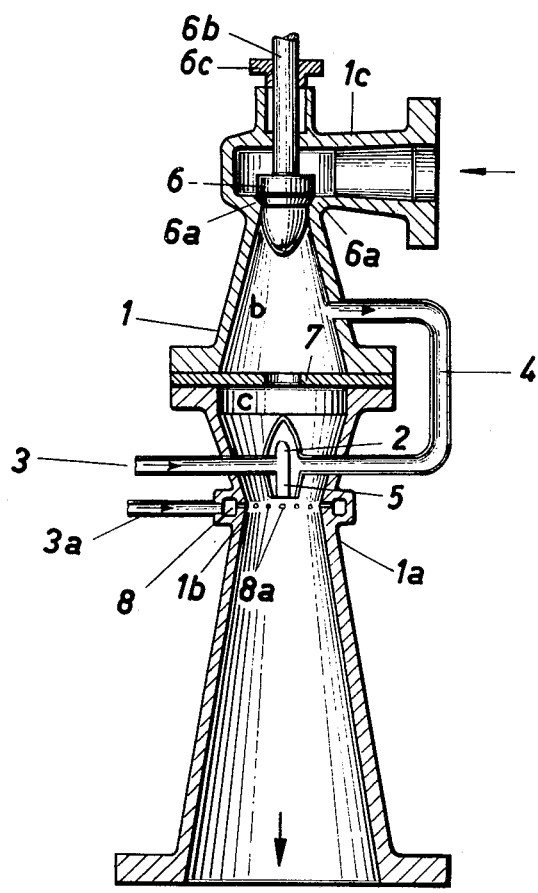
FIGURE 1 is a longitudinal, cross-sectional view of a preferred embodiment of an apparatus of the type described and designed according to the teachings of the present invention.

FIGURE 5 is a cross-sectional view of another form of control apparatus designed according to the teachings of the present invention where the reduction in pressure of the working medium is carried out in a series of individual stages; and FIGURE 6 is a cross-sectional view of a variant of the apparatus of FIGURE 5, wherein the spindle of the regulating valve is provided with the axial bores and radial ducts.

Referring now to the drawings and, more particularly to FIGURE 1, the apparatus designed according to the teachings of the present invention comprises a housing 1 including a Venturi tube portion 1a having a throat portion 1b. The upper portion of the housing 1 is provided with an inlet 1c for the working medium, the supply of which may be controlled by the regulating valve member 6 seatable on shoulder portions 6a of the housing 1. The valve member 6 may be displaced relative to its seat by means of a rod 6b actuatable by means of suitable lever means or otherwise as known to the art, said rod 6b extending externally of the upper end of the housing 1 via a suitable bore provided in the sleeve member 6c. In the region of the narrowest cross-section of the Venturi tube 1a, that is to say, adjacent the throat portion 1b there is arranged sprayer or atomizer means 2, 5 which are supplied with a stream of cooling medium and working medium, as for example, water and vapor, respectively. The supply of water is carried out by means of the conduit 3 and the supply of a branch or tributary stream of vapor is achieved by means of the branch or connecting conduit 4, both of which conduits 3 and 4 operatively communicate with the atomizer means 2, 5.

One would now suppose, to supply to the atomizer means 2, 5 the branch stream of the working medium necessary for atomizing the water stream, in front or upstream of the reduction or regulating valve 6 by means of the connecting branch conduit 4. However, such a measure requires a second closing arrangement for the branch conduit 4 for shutting-off the branch vapor stream for atomizing the water during such times as the regulating valve 6 is in closed position. Such arrangements are complicated and burdensome to industry, require several closing means and associated control units or regulators and, moreover, such constructions are too voluminous and expensive.

In order to relatively simplify such constructions in operation, as well as to essentially economically reduce the cost of manufacture thereof, it is within the teachings of the present invention to provide between the atomizer means 2, 5 and the regulating valve 6 a throttling or constrictive region formed by means of throttle member 7, whereby this throttle member 7 creates behind the regulating valve 6 and in front of the atomizer means 2, 5 subdivided pressure zones $b$ and $c$. By virtue of this bridging arrangement of the throttle member 7 across the housing 1, the branch vapor stream necessary for atomizing the water stream is fed from the pressure zone $b$ of higher pressure to the atomizer means 2, 5 located in the pressure zone $c$ of lower pressure. Additionally, by reason of the above arrangement, when the regulating valve 6 is in closed position there automatically results a shutting-off of the supply of the branch stream of vapor employed for the atomization effect.

It is also possible when working under severe load conditions and, primarily, when there is required a considerable cooling or lowering of the temperature of the medium to be processed, to apply to the main working stream directly in the Venturi tube an additional quantity of water or cooling medium which is supplied from externally of the apparatus. Such is especially the case if the danger exists when working under maximum load conditions that it is not possible to supply a sufficient quantity of water by means of the atomizer means 2, 5 to attain the desired cooling effect. To this end, there is provided behind the atomizer means 2, 5 an additional ring-shaped channel or compartment 8 adapted to receive a supply of water via conduit 3a and feeds the same to the inside of the Venturi tube 1a by means of apertures 8a. Since this supplemental supply of water only occurs during extremely high load conditions, there is also achieved at this point a good atomization of the supplied water. Such an arrangement of annular cooling medium compartment may be provided for each of the embodiments disclosed herein.

It has proven to be advantageous, not only to form the valve 6 so as to be regulatable but also the throttle member 7, whereby during the various load conditions it is possible to achieve a uniform pressure drop between the pressure zones $b$ and $c$. To this end, one may combine or unite a control member, such as a regulating cone at the throttle member 7 with the essential regulating valve 6, so that the throttle member 7 is automatically varied with respect to accompanying movements of the throttle portion or cone of the regulating valve 6.

In FIGURES 2 and 3 there is illustrated a modified structure of the device shown in FIGURE 1, like reference numerals generally denoting similar parts. In the embodiment disclosed in FIGURES 2 and 3, there is provided a throttle portion or cone 9 which has a hollow extension forming atomizer or sprayer means in the form of a spray nozzle 10. The closing or throttle portion of the regulating valve 6, which is adapted to rest on the valve seat 6a of the housing 1, is supported together with the throttle cone 9 and the spray nozzle 10 by means of a hollow spindle or shaft 11.

In accordance with the teachings of the present invention, there are provided connecting or by-pass channels or conduits 12 between the throttle cone 9 and the regulating valve 6, by means of which a portion of the main stream of the working medium may be supplied to the spray nozzle 10 when the regulating valve 6 is in open or raised position. In so doing, the adjustable throttling cone member 9 for the main stream of working medium, and in reach of the connecting channels 12, is formed and arranged in such a manner, that the main stream of working medium and the branch stream formed therefrom necessary for atomizing the water are collectively or simultaneously shut off when the regulating valve 6 is closed.

For this purpose there is arranged, for example, below the regulating valve 6 a necked portion 6d defining the space or compartment 6e. From this space 6e the connecting channel means 12 direct the branch stream of the working medium to the spray nozzle 10. The necked or recessed portion 6d widens below the connecting or by-pass channels 12 to form the essential throttling cone for the main stream and extends to the region adjacent the inner walls 1d of the housing 1 in such a manner that by slight displacements or raising movement of the regulating valve 6, the passageway for the main vapor stream initially remains in approximately closed condition and only a branch stream of the working medium is able to flow through the connecting channels 12 to the spray nozzle 10. The raising and lowering movements of the regulating valve 6 may, by way of example, be performed by means of a lever bar 20 pivotably supported on the frame member 21, in a manner generally known to the art.

In the embodiment illustrated in FIGURES 2 and 3 the cooling medium, such as water, is directed from the supply conduit 3 through an axially extending bore 13 and radial ports 13a provided in the spindle member 13 to the spray nozzle 10. In front of said spray nozzle 10 and surrounding the lower extremity of the axial bore 13 for the water, there is provided an annular vapor compartment 14, which compartment is in unobstructed registry with the annular space 6e formed by the recessed or necked portion 6d through the intermediary of the connecting channels 12. The branch vapor stream which is conducted from compartment or space 6e, formed by the necked portion 6d, through the connecting channels 12 into the vapor compartment 14 flows with a relatively high velocity and thus carries with it the water conducted through the axial bore 13, whereby the water is finely atomized by suitably constructing the spray nozzle 10 and is then commingled with the main stream of working medium in the Venturi tube portion 1a of the housing 1. It is also equally possible to dispose of the Venturi tube portion 1a and to supply the finely dispersed or atomized water emanating from the spray nozzle 10 into a straight or plane conduit for mixing with the main stream of working medium.

In FIGURE 4 there is illustrated a further embodiment of an apparatus for controlling the pressure and temperature of a gas or vaporific medium and designed according to the teachings of the present invention, like reference numerals again denoting similar elements. The supply of the partial or branch stream of the working medium below the closing or regulating valve 6 is carried out in the same manner as in the embodiment described with reference to FIGURES 2 and 3. The difference between this embodiment and that previously disclosed resides in the manner of supplying the water stream. The throttle cone portion 9 is provided with an axial bore 13a providing communication for the branch stream from the connecting channels 12 to the forwardly extending portion 10a of said throttle portion 9 defining the spray nozzle 10. The extended portion 10a of the throttle cone 9, which serves to conduct the branch stream necessary for atomizing the supplied water, is arranged so as to be axially displaceable in a water supply annulus or sleeve member 15 provided with an annular water chamber 15a. The cooling water is conducted via conduit 3 to this sleeve member 15 and flows out of the annular water chamber 15a via the apertures or bores 16 into the region adjacent the open end or mouth portion of the nozzle 10, with the result that the branch stream flowing from the connecting channels 12 through the nozzle 10 carries along this water and causes atomization thereof. Since the extension portion 10a of the spray nozzle 10 is rigidly secured or integral with the throttle cone portion 9 and movable therewith, it is possible for the spray nozzle 10 to controllably influence the supply of water through the bores 16.

It is also possible to arrange the connecting channels 12 in two or more superimposed rows. In such an arrangement, the possibility exists to already regulate the quantity of the branch stream of the working medium by means of the relative degree of opening of the regulating valve 6, even before the actual throttling cone portion 9 for the main stream of working medium is fully actuated. When there is undertaken a further opening of the regulating valve 6 and by actuating the throttling cone 9 provided for regulating the main stream of working medium, the connecting channels 12 are disposed in the region of high pressure of the housing 1, and permit as much vapor to flow to the spray nozzle 10 as is required to obtain the desired high degree of atomization of the water stream.

In FIGURES 5 and 6 there are illustrated two further variants of the present invention, wherein like reference numerals generally denote similar parts. In this FIGURE 5, there is illustrated a regulating valve 6 constructed to carry out a reduction of pressure of the working medium in a series of individual stages. Such form of regulating valve is especially gainfully employed when working with high pressure differences in order that the entire pressure difference or drop is divided up in individual increments of pressure. In the drawings, reference numeral 6 again denotes the essential closing or regulating valve, whereas the regulating or throttling cone 9 of FIGURE 3 is here depicted by the throttle plates or disks 17 extending radially of the axis of the valve 6 in the direction of the inner walls 1*d* of the housing 1. It should be apparent from an inspection of the drawings that such inner walls 1*d* provide valve seat means for the regulating valve 6 and the plates 17. These series of tandemly arranged throttle disk 17 which may, for example, be formed integral with the regulating valve 6, divide up the main vapor stream in a series of stepped chambers, that is, pressure chambers *d, e, f, g, h*. It is to be appreciated that in the pressure chamber *d* a considerably higher pressure exists than in the pressure chamber *h*. This form of construction is employed to withdraw from one of the first formed pressure chambers, such as chamber *d*, the branch stream necessary for atomizing the injected water stream received from conduit 3, and conducting this branch stream via the connecting conduit 4 to the essentially provided atomizer means 18. The atomizer means 18 are substantially similar in construction to the atomizer means 2, 5 of FIGURE 1, and is arranged in the region of the Venturi-shaped outlet 1*a* of the housing 1. As depicted in the further embodiment of FIGURE 6, it is also possible to provide for feed of vapor to the pressure chamber *h* by providing the spindle 11 with a bore 13*b* and radial ports or ducts 13*c*, as for example, communicating pressure chamber *d* with pressure chamber *h*, whereas the water stream may be supplied from the opposite side via the bore 13*d* and radial port 13*e* provided in the spindle or shaft member 11. It is to be appreciated that in all the embodiments disclosed at least one connecting channel means is provided for the branch stream of vapor or working medium.

In the last-mentioned embodiment of FIGURE 6 employing opposed feed of the branch stream and water, the atomized water is fed directly into the pressure chamber *h* for mixture with the main stream and the atomizer unit 18 can be dispensd with. It should be appreciated that in the embodiment of FIGURE 6, the bore 13*c* for the vapor and the radial port or bore 13*e* for the water discharge into pressure chamber *h* via a channel means 13*f* providing the atomizer means for this system and formed between confronting walls 13*g* of the regulating valve 6 and disposed adjacent the respective outlet end of such bores 13*c*, 13*e*, as clearly shown in the drawing. It is also to be noted, that while in the embodiments disclosed the housings thereof have been shown provided with a Venturi portion, it is equally possible to employ other forms of discharge portions, such as a straight or plane conduit, as described with respect to FIGURE 2.

The plate members 17 of the throttle portion cooperate with the valve portion and the wall means of the housing (as shown in FIGURES 5 and 6) such that when the valve portion is slightly opened the steam can substantially only flow through the connecting channel to form a branch stream of steam. The valve portion when in the closed position as shown in these figures will contact the wall of the housing for simultaneously shutting-off the supply of steam for forming both the main and branch stream.

Having thus described the present invention what is desired to be secured by United States Letters Patent, is:

1. In an apparatus of the type described for regulating the temperature and pressure of a gaseous or vaporific medium, particularly steam, comprising a housing, atomizer means arranged in said housing, said housing being provided with inlet and outlet means for a main stream of working medium, a valve member cooperating with said inlet means for regulating the supply of said working medium, means for supplying a cooling medium to said atomizer means, throttle means disposed in said housing for regulating the pressure of said working medium, connecting conduit means for directing a branch stream of said working medium into said atomizer means for atomizing said cooling medium, said throttle means being disposed between said valve member and said atomizer means, said connecting conduit means and said atomizer means being arranged downstream of said valve member with respect to the direction of flow of said working medium so that closing of said valve member interrupts supply of said working medium and said branch stream.

2. In an apparatus of the type described for regulating the pressure and temperature of a gas or vaporific working medium comprising a housing, atomizer means arranged in said housing, said housing being provided with inlet means for a main stream of working medium, a valve member cooperating with said inlet means for regulating the supply of said working medium, means supplying a cooling medium for said atomizer means, throttle means disposed between said atomizer means and said valve member for altering the pressure of said working medium, at least one connecting conduit means for directing a branch stream of said working medium into said atomizer means for atomizing said cooling medium, said connecting conduit means and said atomizer means being arranged downstream of said valve member with respect to the direction of flow of said working medium so that closing of said valve member interrupts supply of said working medium and said branch stream.

3. In an apparatus of the type described for regulating the pressure and temperature of a gas or vaporific working medium according to claim 2; wherein said housing includes a Venturi tube having a throat portion, said atomizer means being arranged in the region adjacent said throat portion.

4. In an apparatus of the type described for regulating the pressure and temperature of a gas or vaporific working medium according to claim 2; wherein said throttle means arranged in said housing between said valve member and said atomizer means including means forming regions of different pressure, said regions of different pressure including a region of higher pressure located upstream of said throttle means and a region of lower pressure located downstream of said throttle means, said atomizer means being located in said region of lower pressure, said connecting conduit means directing a branch stream of working medium from said region of higher pressure to said atomizer means located in said region of lower pressure for atomization of said cooling medium, said atomized cooling medium being directed into said main stream of working medium located in said region of lower pressure.

5. In an apparatus of the type described for regulating the pressure and temperature of a gas or vaporific working medium according to claim 4; wherein said throttle means extends across said housing.

6. In an apparatus of the type described for regulating the pressure and temperature of a gas or vaporific working medium according to claim 4; wherein said throttle means is rigidly supported by said valve member and is movable therewith, said throttle means being a throttle cone regulating the throughflow of said main stream of working medium in the direction of said atomizer means.

7. In an apparatus of the type described for regulating the pressure and temperature of a gas or vaporific working medium according to claim 6; wherein a plurality of superimposed connecting conduit means are arranged between said valve member and said throttle cone.

8. In an apparatus of the type described for regulating the pressure and temperature of a gas or vaporific working medium according to claim 4; wherein an annular compartment is provided adjacent and downstream of said atomizer means for directing a further quantity of cooling medium to said main stream of working medium during operation under relatively high load conditions.

9. In an apparatus of the type described for regulating the pressure and temperature of a gas or vaporific working medium according to claim 6; wherein said housing includes means providing a valve seat, said valve member is provided with a closure portion adapted to engage said valve seat, said connecting conduit means extending between said closure portion and said throttle cone of said throttle means.

10. In an apparatus of the type described for regulating the pressure and temperature of a gas or vaporific working medium according to claim 9; wherein wall means are provided which cooperate with said throttle cone such that during slight raising movements of said closure portion of said regulating valve relative to its valve seat said throughflow of said main stream of working medium is substantially cut-off by said throttle cone, with only said branch stream of said working medium flowing through said connecting conduit means to said atomizer means.

11. In an apparatus of the type described for regulating the pressure and temperature of a gas or vaporific working medium according to claim 6; wherein spindle means are secured to said valve member for simultaneously displacing said valve member and throttle cone, said atomizer means being defined by an extended wall portion directly connected with said throttle cone.

12. In an apparatus of the type described for regulating the pressure and temperature of a gas or vaporific working medium according to claim 11; wherein said spindle means is provided with bore means for directing said cooling medium from its supplying means to said atomizer means.

13. In an apparatus of the type described for regulating the pressure and temperature of a gas or vaporific working medium according to claim 11; wherein said supplying means for a cooling medium includes a supply conduit, a sleeve member provided with aperture means and a compartment for receiving said cooling medium from said supply conduit, said atomizer means including said extended wall portion being slidably arranged in said sleeve member, said aperture means operably communicating said compartment with said atomizer means to enable flow of said cooling medium from said compartment in the direction of said atomizer means.

14. In an apparatus of the type described for regulating the temperature of a gaseous or vaporific medium, particularly steam comprising a housing, atomizer means arranged in said housing, said housing being provided with inlet and outlet means for a main stream of steam, a valve member cooperating with said inlet means for regulating the supply of said steam, said atomizer means being arranged downstream of said valve member, means for supplying water to said atomizer means, connecting conduit means arranged downstream of said valve member for directing a branch stream of said steam into said atomizer means for atomizing said water, throttle means disposed in said housing between said valve member and said atomizer means to divide said housing into at least two regions of differing pressure, said connecting conduit means having an inlet portion located in a region of higher pressure than said atomizer means located in a region of lower pressure, said connecting conduit means directing said branch stream of said steam from said region of higher pressure to said atomizer means, said valve member simultaneously controlling the flow of said main stream of steam and said branch stream.

15. In an apparatus of the type described for regulating the temperature and pressure of a gaseous or vaporific medium, particularly steam comprising a housing including inlet and outlet means for a supply of steam, a spindle member axially movable in said housing and successively including a valve portion, a throttle portion and an atomizer portion, said throttle portion being positioned between said valve portion and said atomizer portion, said throttle portion controlling the pressure and flow of a main stream of working medium in the direction of said atomizer portion, supply means for a quantity of water including bore means provided for said spindle defining a passageway for transfer of said water to said atomizer portion, at least one connecting channel positioned between said valve portion and said throttle portion for directing a branch stream of said steam to said atomizer portion, means for actuating said valve portion into open and closed position, said throttle portion incorporating means cooperating with said valve portion such that with said valve portion only slightly opened said steam can substantially only flow through said connecting channel to form said branch stream of steam, said valve portion when in closed position simultaneously shutting-off the supply of steam for forming said main and branch stream.

16. In an apparatus of the type described for controlling the temperature and pressure of a gaseous or vaporific medium, particularly steam comprising a housing including inlet and outlet means for a supply of steam, a spindle member axially movable in said housing and successively including a valve portion, a throttle portion and an atomizer portion, said throttle portion being positioned between said valve portion and said atomizer portion, said throttle portion controlling the flow of a main stream of steam in the direction of said atomizer portion, a supply conduit for a quantity of water, a sleeve member provided with a water compartment surrounding said atomizer portion for transfer of said water between said supply conduit and said atomizer portion, means for displacing said spindle member including said atomizer portion relative to said sleeve member, at least one connecting channel positioned between said valve portion and said throttle portion for directing a branch stream of said steam to said atomizer portion, means for actuating said valve portion into open and closed position, said throttle portion including means cooperating with said valve portion such that with said valve portion only slightly opened said steam can substantially only flow through said connecting channel to form said branch stream of steam, said valve portion when in closed position simultaneously shutting-off the supply of steam for forming said main and branch stream.

17. An apparatus of the type described for controlling the temperature and pressure of a gaseous or vaporific medium, particularly steam comprising a housing including inlet and outlet means for a supply of steam, a spindle member axially movable in said housing and including a valve portion and a throttle portion, said throttle portion including a plurality of spaced plate members defining a series of tandemly arranged pressure compartments of decreasing pressure taken in the direction away from said valve portion, atomizer means arranged in said pressure compartment of lowest pressure, at least one connecting channel for communicating at least one of the pressure compartments of higher pressure with said atomizer means, said throttle portion including means for controlling the pressure and flow of a main stream of working medium in the direction of said atomizer means, said housing including wall means providing valve seat means for said valve portion and said plate members, a supply conduit for a quantity of water in registry with said atomizer means, means for actuating said valve portion into open and closed position, said plate members of said throttle portion cooperating with said valve portion and said wall means of said housing such that with said valve portion only slightly opened said steam can substantially only flow through said connecting channel to form a branch stream of steam, said valve portion when in closed position contacting said wall means of said housing for simultaneously shutting-off the supply of steam for forming said main and branch stream.

References Cited by the Examiner

UNITED STATES PATENTS

| | | | |
|---|---|---|---|
| 1,415,383 | 5/22 | Nettgens | 239—417 |
| 1,434,238 | 10/22 | Weber | 158—76 |
| 1,663,724 | 3/28 | Palmer | 261—57 |
| 1,847,571 | 3/32 | Nilsson | 261—57 |
| 2,764,455 | 9/56 | Seibel | 239—430 |
| 3,009,687 | 11/61 | Hendricks | 261—112 |

FOREIGN PATENTS 139,597   11/30   Switzerland.

HARRY B. THORNTON, *Primary Examiner.*

HERBERT L. MARTIN, *Examiner.*